Figure 1:
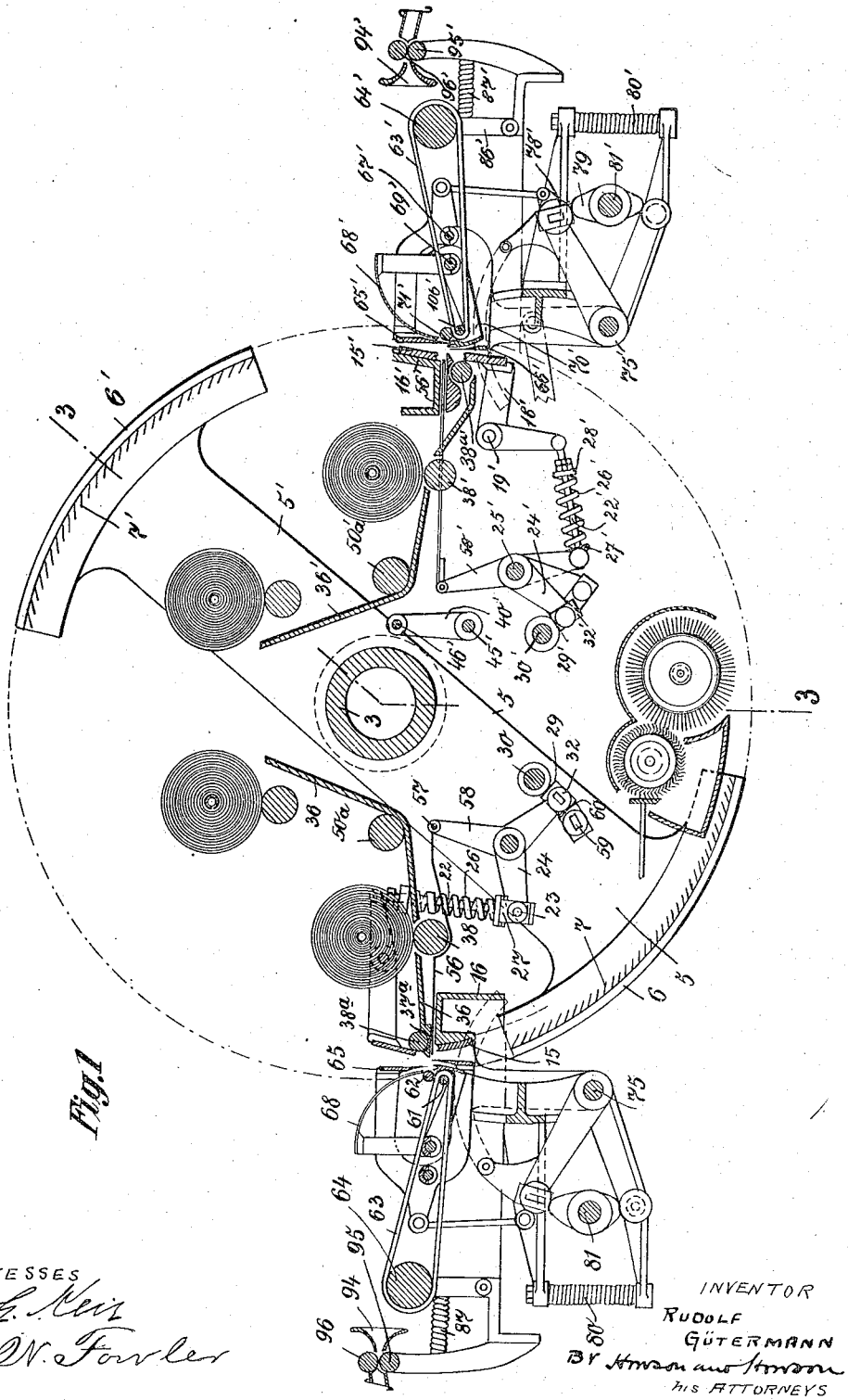

R. GÜTERMANN.
COMBING MACHINE.
APPLICATION FILED JULY 31, 1914.

1,190,997.

Patented July 11, 1916.
11 SHEETS—SHEET 1.

WITNESSES

INVENTOR
RUDOLF GÜTERMANN
BY Howson and Howson
his ATTORNEYS

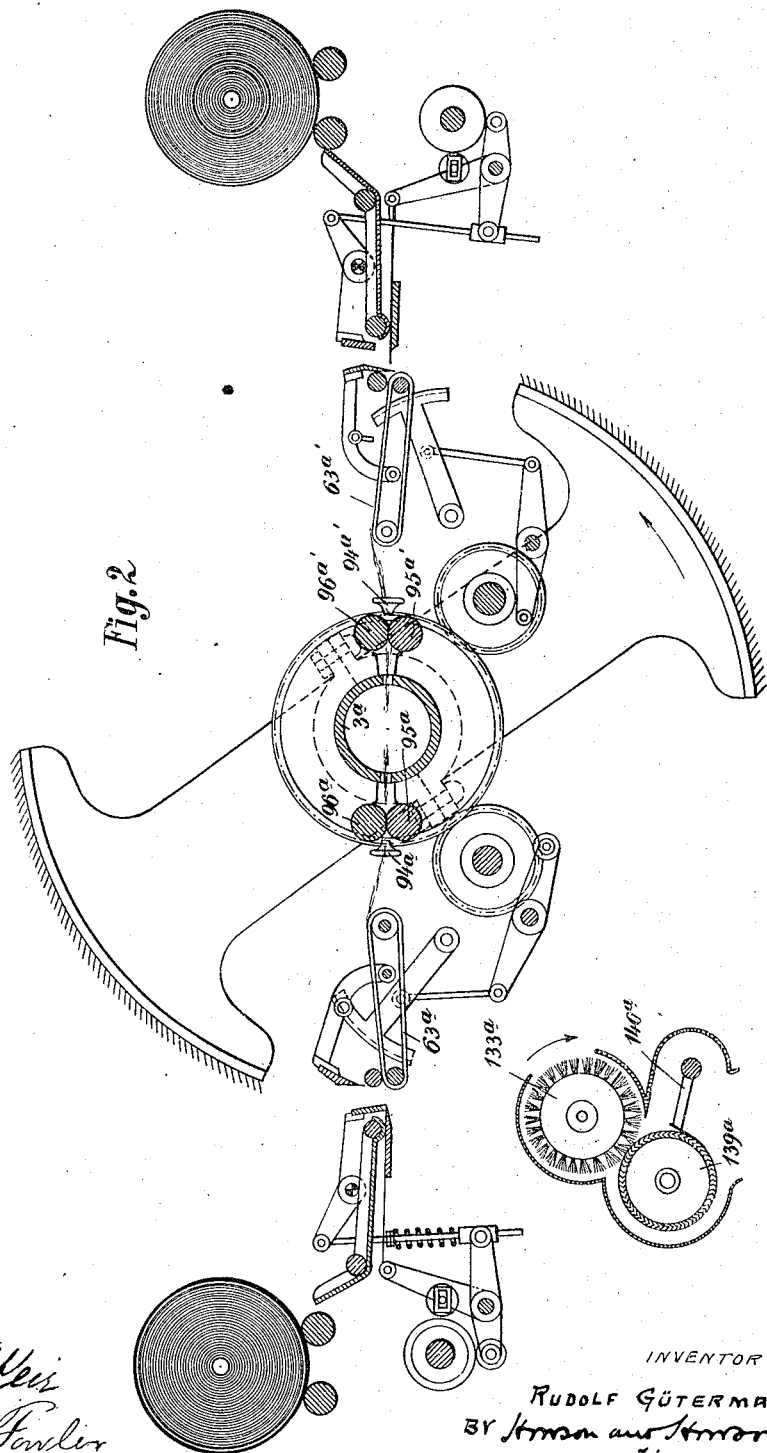

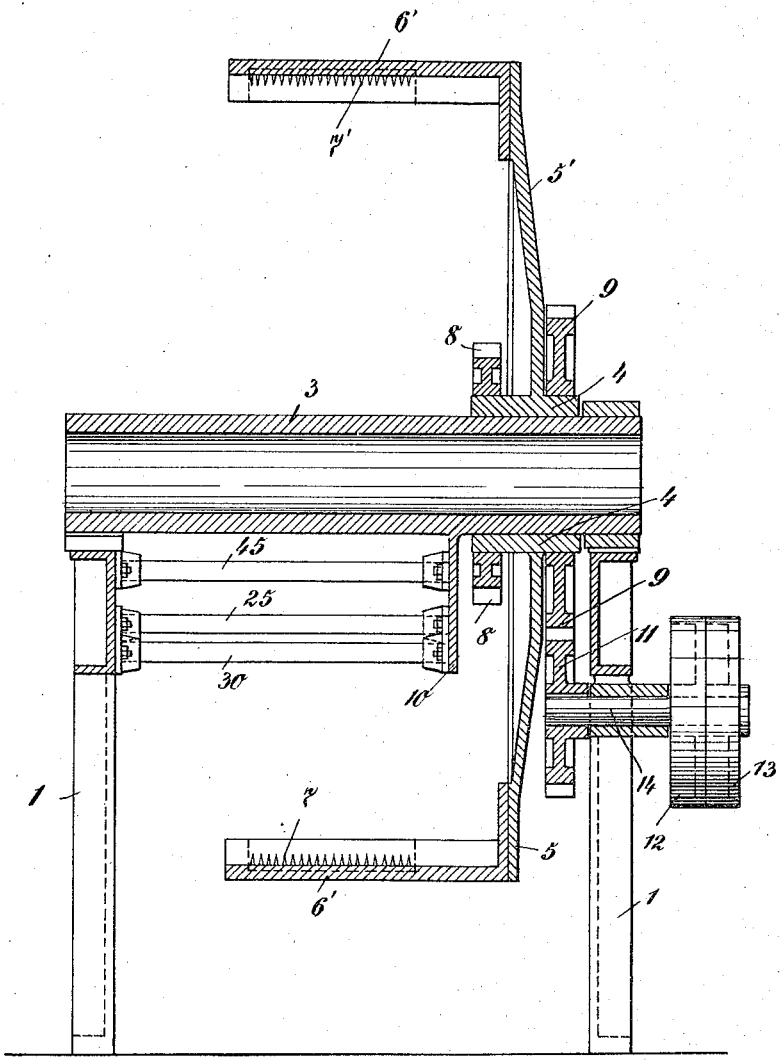

R. GÜTERMANN.
COMBING MACHINE.
APPLICATION FILED JULY 31, 1914.

1,190,997.

Patented July 11, 1916.
11 SHEETS—SHEET 4.

WITNESSES

INVENTOR
RUDOLF GÜTERMANN
BY
his ATTORNEYS

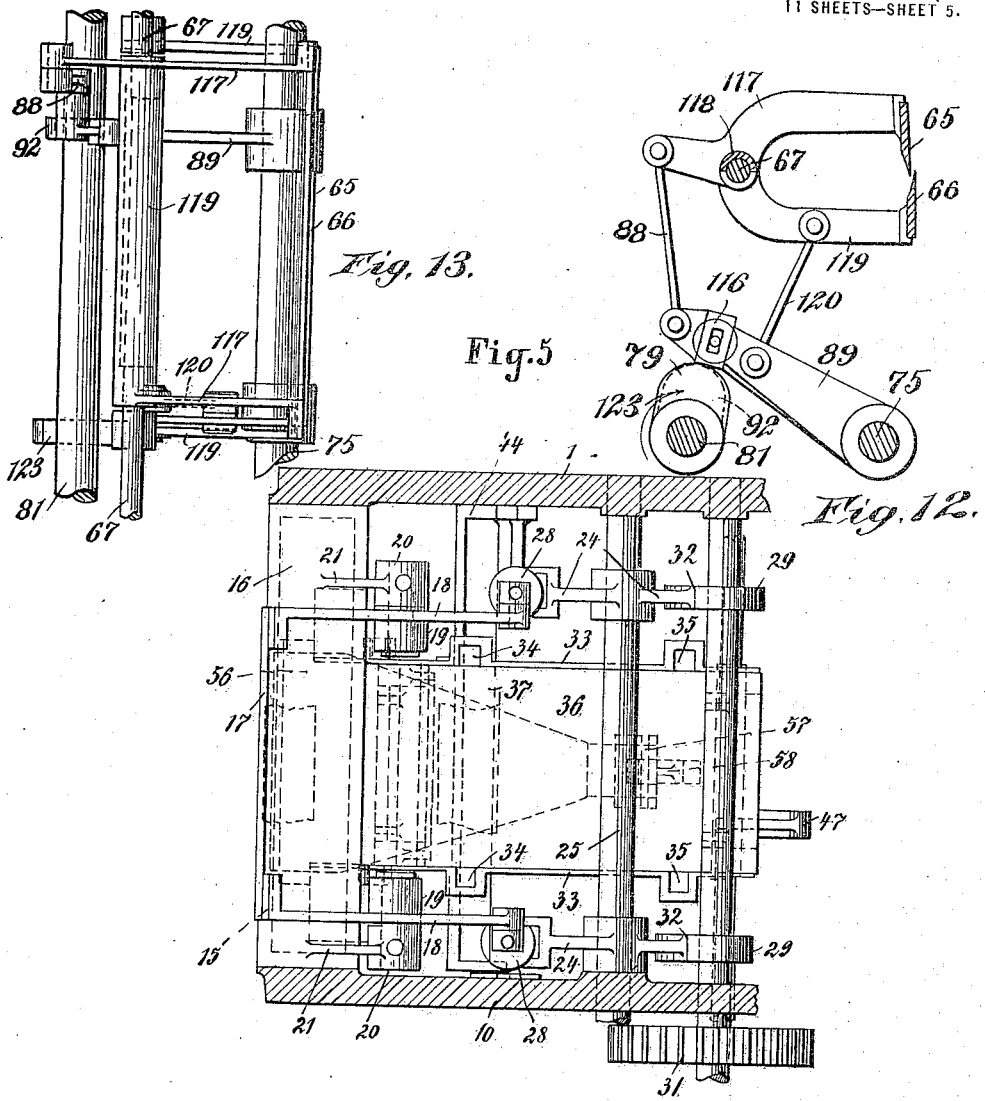

R. GÜTERMANN.
COMBING MACHINE.
APPLICATION FILED JULY 31, 1914.

1,190,997.

Patented July 11, 1916.
11 SHEETS—SHEET 6.

WITNESSES
INVENTOR
RUDOLF GÜTERMANN
BY
his ATTORNEYS

R. GÜTERMANN.
COMBING MACHINE.
APPLICATION FILED JULY 31, 1914.

1,190,997.

Patented July 11, 1916.
11 SHEETS—SHEET 7.

WITNESSES

INVENTOR
RUDOLF GÜTERMANN
BY
his ATTORNEYS

R. GÜTERMANN.
COMBING MACHINE.
APPLICATION FILED JULY 31, 1914.
1,190,997.
Patented July 11, 1916.
11 SHEETS—SHEET 8.
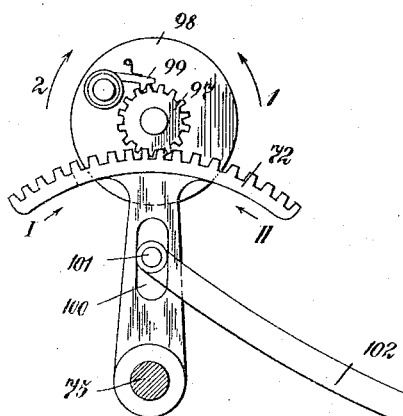
Fig. 10
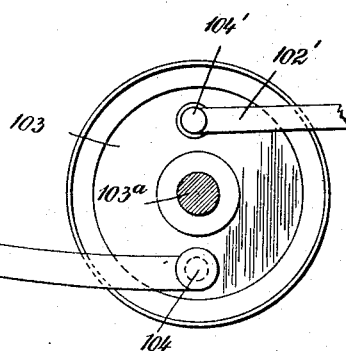
Fig. 11
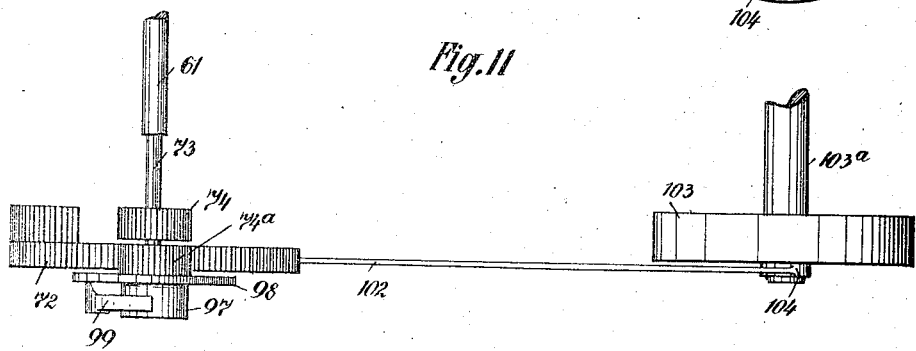
WITNESSES
INVENTOR
RUDOLF GÜTERMANN
BY
his ATTORNEYS

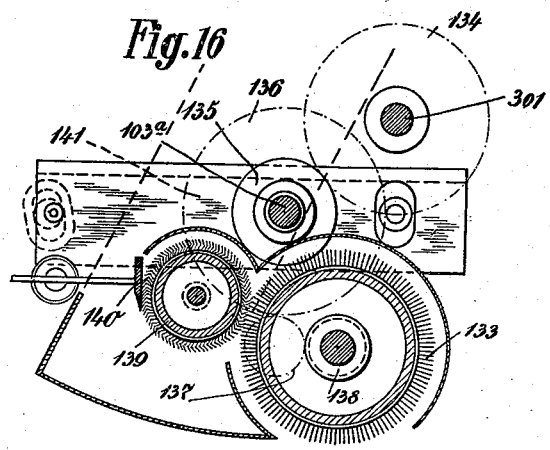
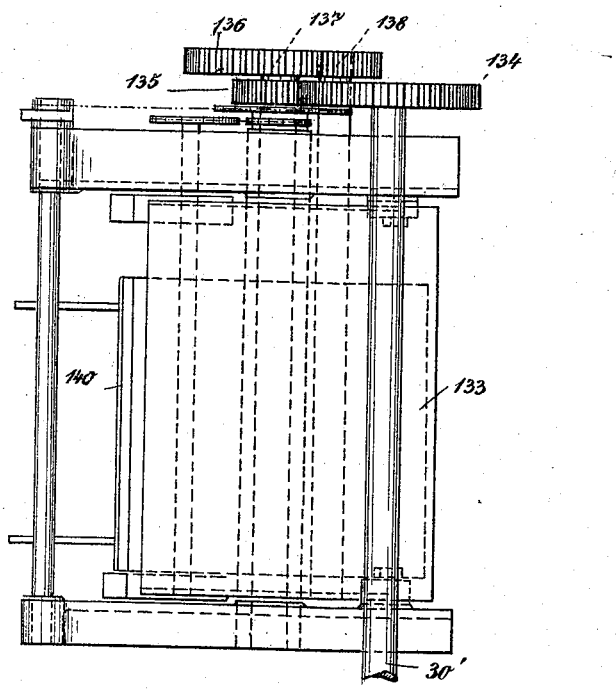

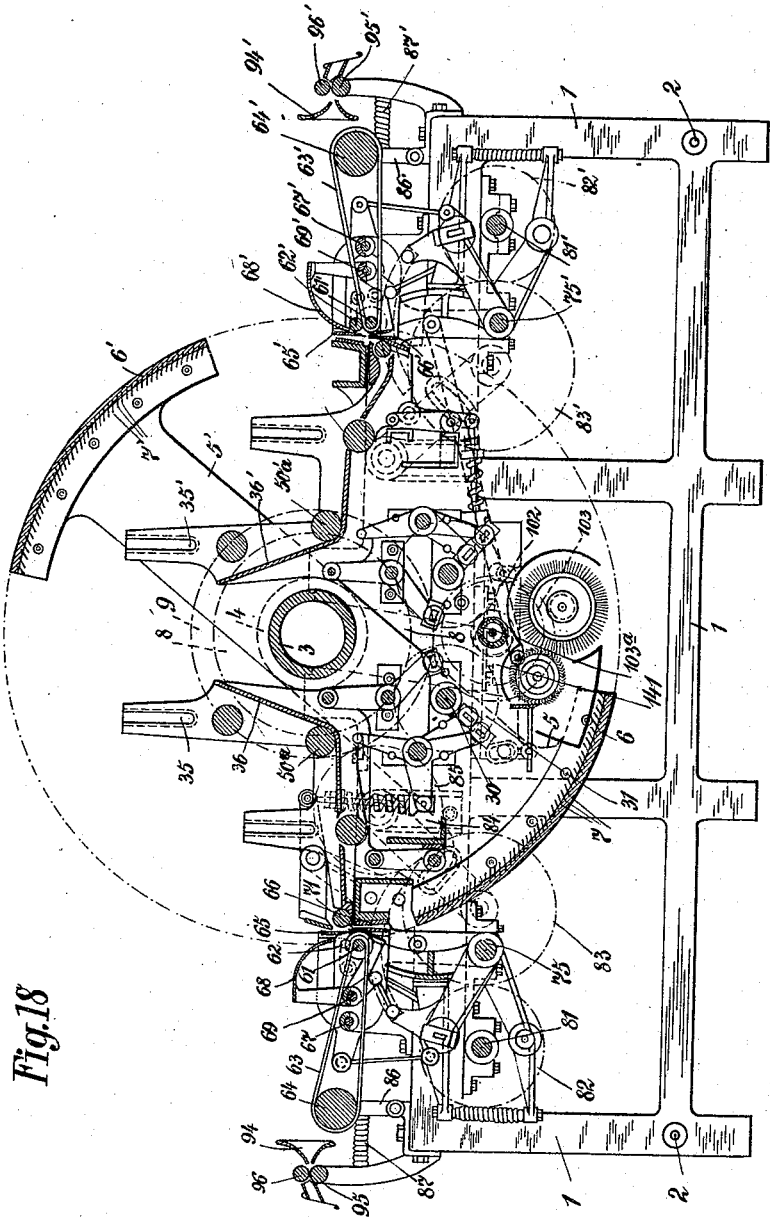

R. GÜTERMANN.
COMBING MACHINE.
APPLICATION FILED JULY 31, 1914.
1,190,997.
Patented July 11, 1916.
11 SHEETS—SHEET 11.
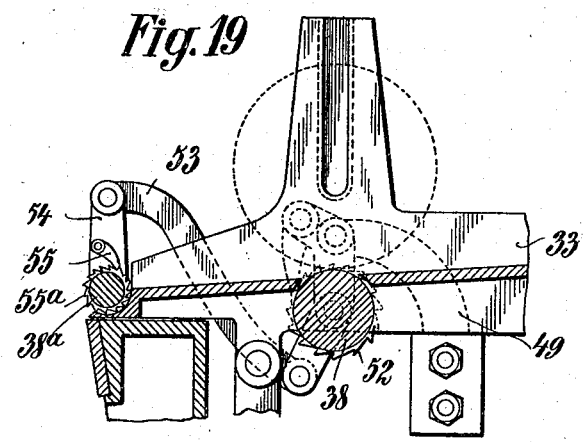
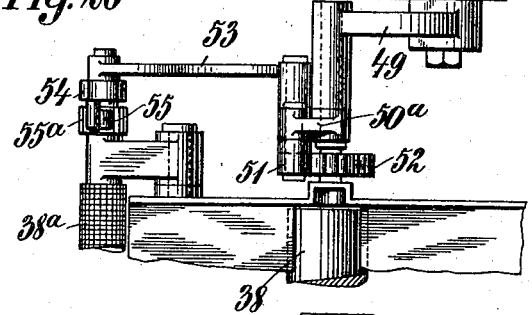
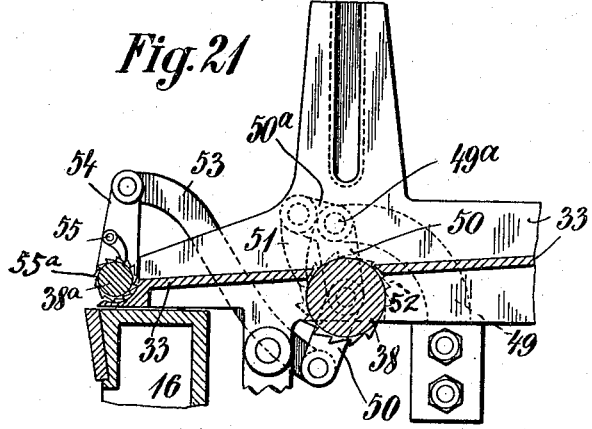
INVENTOR
RUDOLF GÜTERMANN
BY Simson and Simson
Attorneys

UNITED STATES PATENT OFFICE.

RUDOLF GÜTERMANN, OF PEROSA ARGENTINA, ITALY.

COMBING-MACHINE.

1,190,997.  Specification of Letters Patent.  Patented July 11, 1916.

Application filed July 31, 1914.  Serial No. 854,302.

*To all whom it may concern:*

Be it known that I, RUDOLF GÜTERMANN, a subject of the Emperor of Germany, residing at Perosa Argentina, Piemonte, Italy, have invented certain new and useful Improvements in Combing-Machines; and I do hereby declare the following to be a full, clear, and exact description of the invention.

This invention relates to a combing machine of the type comprising a single or double combing segment adapted to be moved between the feeding and the stripping devices.

A primary object of the invention is to provide an improved combing machine of the type described in which the combing segment, or each combing segment if more than one, is arranged to rotate about an axis parallel with the feeding and stripping devices, one or other of the said devices being located within the circle described by the revolving combing segments.

This novel arrangement has the advantage of enabling the combing segments to be made of a relatively large radius, so that the path of the individual combs when passing through the beard or projecting ends of the fibrous material is no longer an arc of very small radius, but one of large radius, whereby the work of the combing segments is greatly facilitated. In addition, this arrangement admits of the number of comb bars on a segment being materially increased.

To this and other ends, the invention consists in the construction, arrangement and combination of parts described hereinafter and pointed out in the claims.

Figures 4, 14, 15:
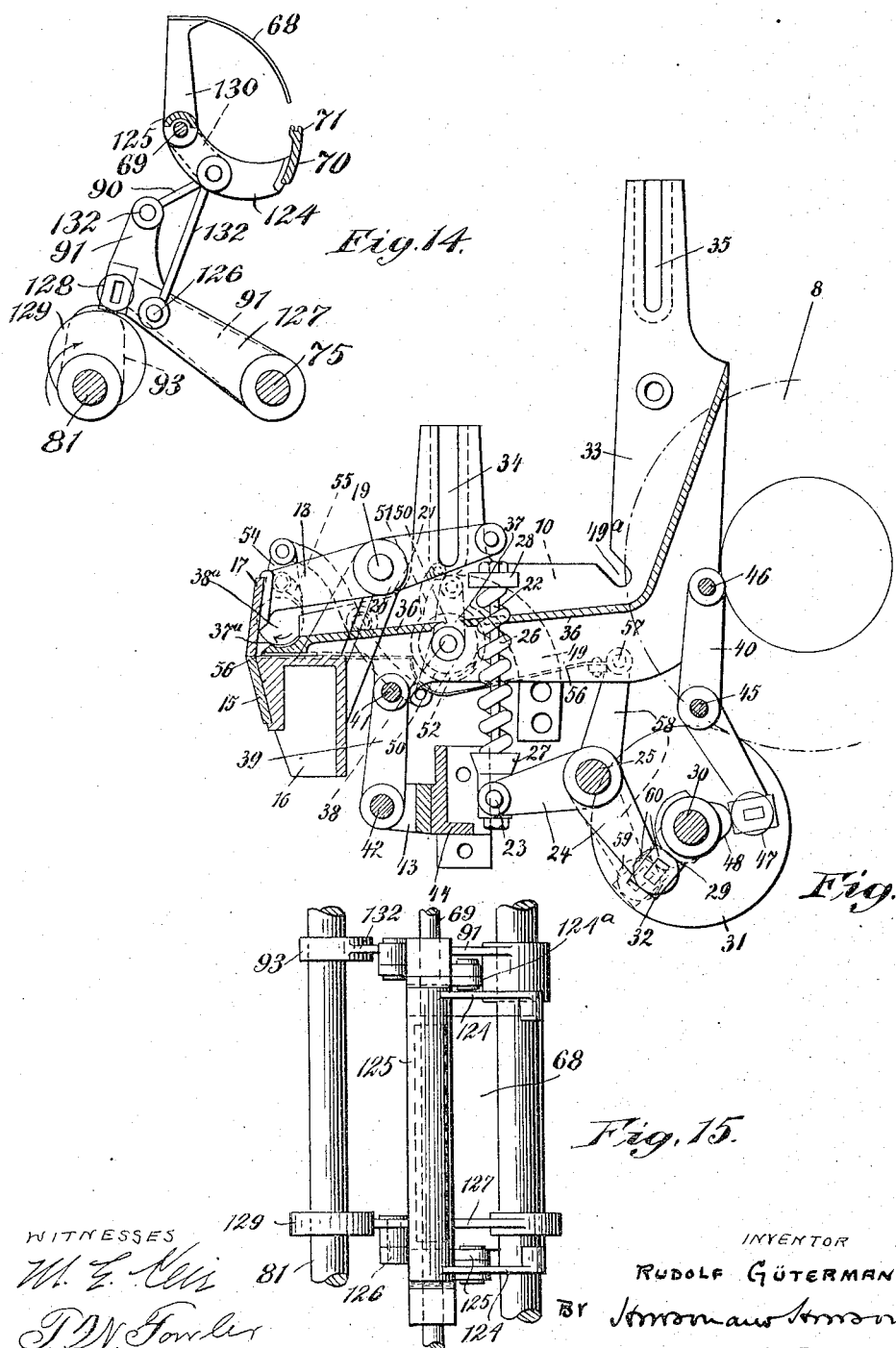
Figure 6:
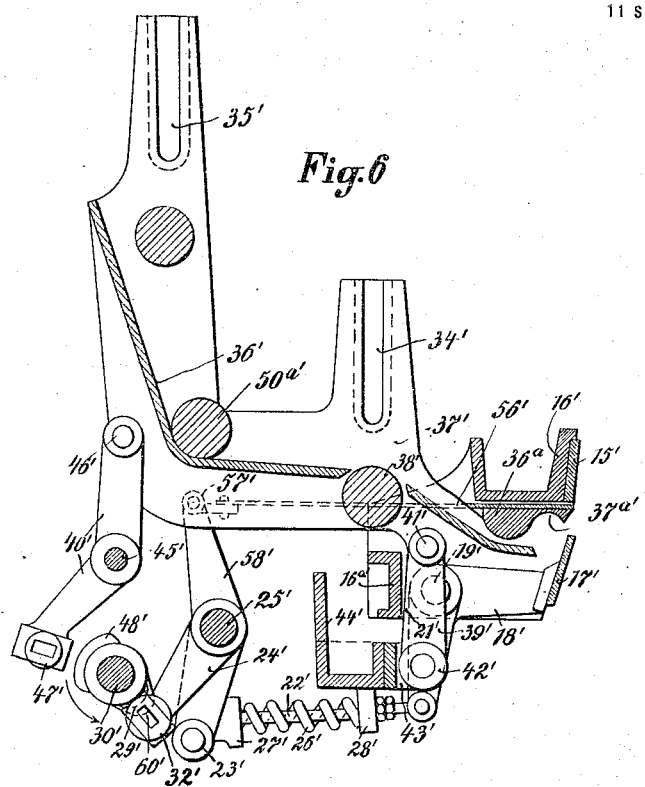
Figure 7:
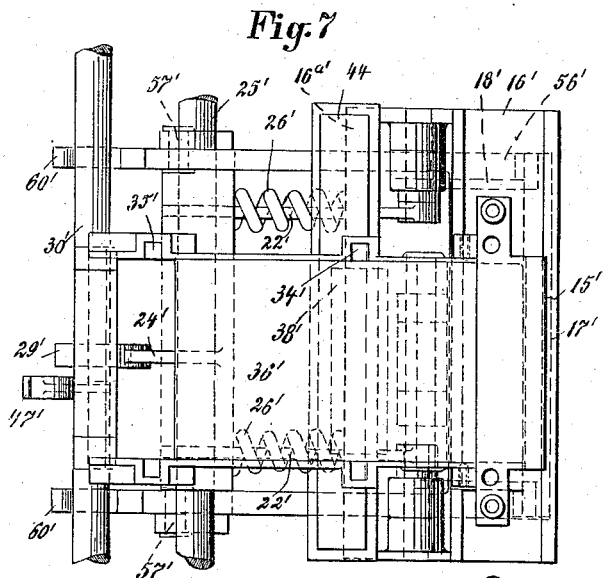

Two illustrative embodiments of the invention are represented by way of example in the accompanying drawings, wherein:

Figure 1 is a vertical section showing the essential parts of a two-headed combing machine having combs arranged on the inside of the sectors, and in which the combs rotate about the feeding and cleaning devices, and Fig. 2 is a like view of a two-headed combing machine having combs arranged on the outside of the sectors; Fig. 3 is a section through the combing segments taken on the bent line 3—3 in Fig. 1; Fig. 4 is a vertical section through the left-hand feeding device, and Fig. 5 is a top plan view of the same; Fig. 6 is a vertical section through the right-hand feeding device, and Fig. 7 is a top plan view of the same; Figs. 8 to 15 show details of the left-hand stripping device, Fig. 8 being a vertical section through the journals of the stripping rollers in this device, and Fig. 9 a front elevation of the same; Fig. 10 is a front elevation of the driving device of the front stripping rollers, and Fig. 11 a top plan view thereof; Fig. 12 is a sectional elevation showing the upper and lower pricking combs and their driving devices, and Fig. 13 is a top plan view thereof; Fig. 14 is a vertical section through the lower stripping comb, the saber-shaped striker and their driving devices, and Fig. 15 is a top plan view thereof; Fig. 16 is a vertical section through the cleaning device of the combing segments, and Fig. 17 is a top plan view thereof; and Fig. 18 is a vertical section through the entire combing machine; in this view the driving wheels of the various parts are shown only diagrammatically. Figs. 19 and 20 are respectively side elevation and plan of the mechanism for actuating feed rolls 38 and 38ª; and Fig. 21 is a view similar to Fig. 19 but showing the parts in different position.

Referring firstly to Figs. 1, 3 and 18, the machine frame 1 comprises two side walls which are connected together by rods 2 and carry various shafts referred to hereinafter. The stationary hollow shaft 3 on which the hub or sleeve 4 rotates is carried by this frame, and the arms 5 and 5' of the combing segments 6 and 6' respectively, are carried by this hub. The combing segments are disposed at right angles to their arms and carry pins 7 and 7', respectively, on their inner sides. Gear wheels 8 and 9 are keyed on the hub 4 at the two sides of the arms 5 and 5'. The inner gear wheel 8 is adapted to drive the devices located within the revolving segments, namely the two feeding devices and the cleaning device, which are carried on one side by the inner side wall 10 extending downward beside the plane of rotation of the arms 5 and 5′, and on the other side by the frame 1. The outer gear wheel 9 meshes with the gear wheel 11 of the main driving shaft 14 which is journaled in the frame 1 and carries the fast pulley 12 and the loose pulley 13. Consequently, when the pulley 12 is driven the arms 5 and 5′ and the combing segments 6 and 6′ are rotated. The outer gear wheel 9, which is of larger diameter than the inner gear wheel 8, also drives the stripping devices by means of suitable transmission gearing.

Referring now to Figs. 4, 5 and 18 showing the left-hand feeding device, the combing segments comb on the left-hand side of the machine from above downward. Accordingly, the lower jaw 15 of the clamp of the feeding device is rigidly connected with a crosspiece 16 which extends from the frame 1 into the space between the segments and is connected on the other side with the wall 10. The upper jaw 17 of the clamp is movable and is attached to one end of two symmetrical two-armed levers 18, the pivot pins 19 of which are each carried in an eye 20 of a bracket 21 mounted on the crosspiece 16. The other end of each of the levers 18 is pivotally attached to a rod 22 which is connected by means of a pivot pin 23 with one arm of a two-armed lever 24 free to rotate about a shaft 25 carried by the frame 1 and by the side wall 10. Each rod 22 is surrounded by a coil spring 26 which bears at one end against a collar 27 on the rod 22 and at the other end against a collar 28 fast on the frame 1 or the wall 10. The other arm of each lever 24 carries an anti-friction roller 32 which co-acts with a cam 29 keyed on the shaft 30 journaled in the frame 1 and in the side wall 10. A gear wheel 31 which meshes with the gear wheel 8 is also keyed on this shaft, so that the clamp is actuated by the shaft 14 by means of the gear wheels 11, 9, 8, 31, the cam 29, the two-armed levers 24, the rods 22 and the two-armed levers 18. The left-hand feed mechanism comprises a carrying frame 33 having two grooves 34 and 35 for suspending the pivots of a press roll and a feed or licker-in roller, and a recess 49$^a$ for a guide roller 50$^a$. The two side walls of the carrying frame are connected with one another by the guide plate 36 which has an aperture at 37 for the passage of a lower feed roll 38. An aperture 37$^a$ for an upper feed roll 38$^a$ is provided at the lower end of the guide plate 36. The frame 33 is supported at either side by two links 39 and 40 mounted on the frame 1 and wall 10. Each of the two front links 39 is pivotally connected at one end by means of the pin 41 with the lower part of the carrying frame 33 and at the other end, by means of a pin 42 with an eye 43 mounted on a cross-bar 44 connecting the frame 1 with the wall 10. Each of the two rear links 40 constitutes an angle lever rotatable about a shaft 45 mounted in the frame 1 and wall 10. The upper end of each angle lever 40 is connected by the pivot pin 46 with the carrying frame 33 and the lower end thereof carries an antifriction roller 47 running on a cam 48 fast on the shaft 30. The carrying frame 33 is moved to and fro by the driving shaft 14 by means of the gear wheels 11, 9, 8 and 31, like the clamp mechanism, and by the cam 48 and the angle levers 40. A spring acting on the carrying frame 33 tends to move the same backward so that the roller 47 always bears against the cam 48.

The feed rolls 38 and 38$^a$ journaled in the carrying frame 33, are intermittently rotated by pawl and ratchet mechanism. On the axle of the roll 38 is fixed a ratchet wheel 52, and loosely arranged on the same axle is a two-armed lever 50, the upper end of which is journaled on a boss 49$^a$ on an arm 49, fixed to the frame 1. On the arm 50$^a$ of this lever 50 is journaled the pawl 51, engaging the ratchet wheel 52 of the feed roll 38. The lower end of the lever 50 is connected by a link 53 to a lever 54, loosely arranged on the axle of the second feed roll 38$^a$. This lever 54 is provided with a pawl 55 engaging the ratchet wheel 55$^a$, fixed on the feed roll 38$^a$. When the carrying frame 33 is moved from its forward position, shown in Fig. 19, to its rearward position shown in Fig. 21, the lever 50 swings to the right hand (Fig. 21) on its pivot 49$^a$, the pawl 51 therefore is pushed down and rotates the ratchet wheel 52 and the feed roll 38. Simultaneously the lever 54 is swung by the link 53 to the right hand, and the pawl 55 rotates the feed roll 38$^a$. When the carrying frame 33 is moved again in its forward position the levers 50 and 54 are swung to the left hand, and the pawls 51 and 55 are brought in engagement with other teeth of the ratchet wheels 52 and 55$^a$.

The feed or pusher plate 56 which when the clamp is open brings the combed beard or length of fibrous material to the stripping device slides between the guide plate 36 and the lower jaw 15 or the crosspiece 16, to which the latter is attached. This pusher plate is bent about the feed roller 38 and is attached by means of a pivot pin 57 to one arm of an angle lever 58 rotatable about the shaft 25, the other arm of said lever being provided at its end with an antifriction roller 59 which bears against a cam 60 keyed on the shaft 30. A spring acting on the arm 58 tends to move the plate in the opposite direction, so that the same driving means are used for reciprocating the plate as described above for moving the jaw 17 and the frame 33.

The right-hand feeding device will now be described with reference to Figs. 6, 7 and 18. As the combing segments on the right-hand side of the machine comb from below upward this feeding device differs in certain details from that at the left. The position of the shafts 25' and 30' and that of the supporting links 39' and 40' of the carrying frame 33' and of their points of support 41', 42' and 45', 46' is perfectly symmetrical with that of the left-hand device, and the mode of operation of the entire driving mechanism is also similar. On the other hand, the movable jaw 17' of the clamp is arranged below, the two-armed lever 18' is formed as an angle lever, the connecting rod 22' is horizontal and the arms of the second angle lever 24' form an acute angle. The fixed upper jaw 15' is attached to a U-shaped crosspiece 16' which forms with a second crosspiece 16ª' a frame connected on its two sides with the frame 1 and with the side wall 10. Screwed to the two side walls of the carrying frame and covering the end of the guide plate 36' is another guide member 36ª having a recess 37ª' for the feed roll 38ª'. In contradistinction to the pusher plate 56 of the left-hand feed device which is trapezoidal in shape and is pivotally connected in the middle of the smaller face, the right-hand pusher plate 56' is rectangular. Its ends are connected by means of flat bars with the pivot pins 57' of the two angle levers 58', so that the feed roll 38' and the carrying frame 33 are embraced. Two cams are here keyed on the shaft 30' and co-act with the antifriction rollers 59' carried by the angle levers 58'.

Figure 8:
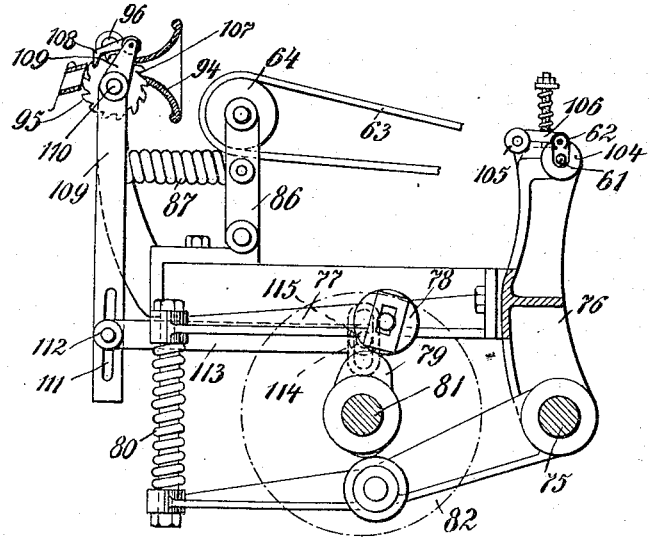

The left-hand stripping mechanism (Figs. 8 to 15 and 18) comprises the known stripping rollers 61 and 62 and the endless apron or leather band 63 which runs around the former roller and over a tensioning roller 64 (Figs. 8 and 18). Stripping combs 65 and 66, whose arms are rotatable about a shaft 67, move from above and from below in front of the stripping rollers. Further, the known striker 68 is provided which prevents the beard torn off by the stripping device from contacting with the rotating combing segment. This striker rocks about a shaft 69, about which swings in addition a lower comb 70 provided with a small groove or trough 71. At the rear of the band 63 is located a well-known flared guide 94 and behind the same two stripping rollers 95 and 96.

The device for driving the two front stripping rollers 61 and 62 substantially consists of a toothed sector 72 (Figs. 10 and 11) having two sets of teeth of different length with the shorter of which sets a pinion 74 keyed on the shaft 73 of the lower roller 61 meshes. On the same shaft is mounted, in addition, a ratchet wheel 97 into which a pawl 99 pivotally mounted on a loose disk 98 takes. A second pinion 74ª which meshes with the longer set of teeth of the sector is connected with the loose disk 98. The sector 72 rocks about a shaft 75 journaled in the frame 1. In the arm of the sector is a slot 100 in which a pin 101 is adjustable. This pin is fast on a rod 102 which is pivoted in such manner at 104 to a gear wheel 103 that the latter constitutes a crank and reciprocates the sector 72 by means of the rod 102. On the same diameter of the wheel 103 as the pin 104 is mounted the pin 104' to which the connecting rod 102' for driving the right-hand stripping rollers is attached. The gear wheel 103 is keyed on the shaft 103ª which is driven by means of a gear wheel 135 keyed on its other end (Figs. 16 and 17). This wheel 135 meshes with a gear wheel 134 fast on the shaft 30'. The shaft 30' is driven by means of the gear wheel 31' keyed on it by the gear wheel 8 which is driven, as described above, by the main driving shaft 14. The toothed segment imparts to the roller 61 a so-called pilgrims step movement in the following manner:

When the sector moves inward in the direction indicated by the arrow I in Fig. 10 the pinion 74ª and the disk 98 are rotated counterclockwise, as indicated by the arrow 1. This rotation is imparted by the pawl 99 to the ratchet wheel 97 and by it to the shaft 73. This movement is the stripping movement for the roller 61. Toward the end of this movement the pinion 74 runs with the shorter set of teeth of the sector. When the movement reverses from that indicated by the arrow I to that indicated by the arrow II both pinions 74 and 74ª mesh with the sector 72 and consequently rotate clockwise in the direction indicated by the arrow 2. As the pinion 74 is loose on the shaft 73, however, and as the pawl 99 slides over the teeth of the ratchet wheel 97 when moving in the direction of the arrow 2, short rearward movement is imparted by the shorter set of teeth to the pinion 74 and to the stripping roller 61.

Figure 9:
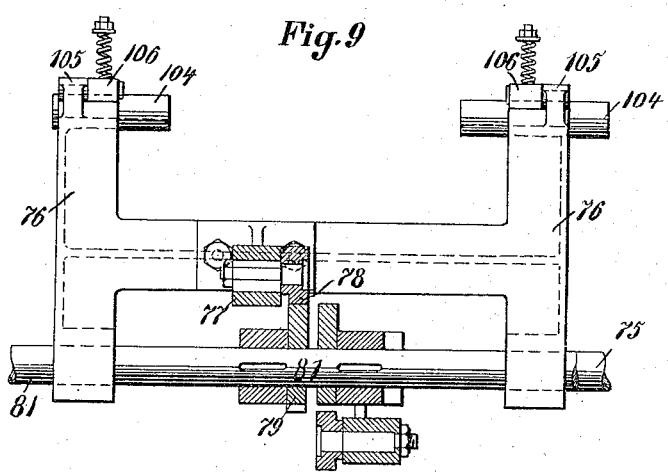

The lower stripping roller 61 is journaled in boxes 104 of two arms 76 rotatable about the shaft 75 (Figs. 8 and 9). Near the boxes 104 the arms 76 have eyes 105 into which spring-pressed links 106 are attached which press the upper roller 62 against the lower roller 61. The rock arm 76 is provided with a branch arm 77 in which is adjustably journaled an antifriction roller 78 which bears against a cam 79. A spring 80 constantly tends to press this roller 78 against the cam 79. As the arm 76 is fulcrumed at 75, it is rocked forward when its arm 77 is lifted by the cam 79. This cam is fast on a shaft 81 journaled at both ends in the frame 1. On the driving side of the frame a flying spur gear 82 is keyed on the shaft 81 (Fig. 18); this gear wheel 82 is driven by means of the intermediate gear wheel 83 and 84 and an intermediate gear wheel 85 mounted on the same shaft as the latter by the last gear wheel 9, and in this manner by the main driving shaft 14. The rear roller 64 of the stripping apron or band 63 is carried by a lever 86 which is influenced in such manner by a spring 87 that the apron remains tensioned when the front stripping rollers move forward and backward. The lower stripping roller 95 behind the flared guide 94 is driven by means of a ratchet wheel 107 (Fig. 8) mounted on its shaft 110, with which wheel a pawl 108 takes which is pivotally connected with the end of the shorter arm of an angle lever 109 rotatable about the shaft 110; the longer downwardly directed arm of this lever is connected by means of a link 112, adjustable in a slot 111, with one end of a rod 113 whose other end is pivotally connected with the above-mentioned gear wheel 82. The link 115 can be adjusted in a slot 114 of the gear wheel 82. The upper stripping roller 96 is driven by the lower roller 95. The upper stripping comb 65 (Figs. 12 and 13) is driven by means of a rod 88 whose one end is pivotally connected to the outside end of one of the two levers 117 formed as two-armed levers rotatable about the shaft 67 and carrying the comb 65. Above the shaft 67 is placed a semi-cylindrical box 118 connecting the two levers 117. The rod 88 is pivotally connected at its other end to a lever 89. This lever carries an antifriction roller 116 and is pressed by a spring, not shown, against a cam 92 keyed on the shaft 81, so that when the cam 92 is rotated the upper comb 65 is moved up and down. The lower stripping comb 66 (Figs. 12 and 13) is driven in the same manner. The comb 66 is pivotally connected to the shaft 67 by means of two arms 119 which are located outside the arms 117 of the upper comb 65. Pivotally connected to one of the arms or levers 119 is a rod 120 which in turn is connected with a lever 121 rotatable about the shaft 75 and supported by means of an antifriction roller 122 at its free end by a cam 123 keyed on the shaft 81. The lower comb 70 provided with the box 71 is driven in a similar manner. As shown in Figs. 14 and 15, two arms 124 lead from the comb 70 to a semi-cylindrical box 125 which is located over the shaft 69 and embraces the same. Pivotally connected to the one-armed levers or arms 124 is a rod 125 which is attached to a pivot pin 126 on a one-armed lever 127 rotatable about the shaft 75 and carrying at its free end an antifriction roller 128 coacting with the cam 129 keyed on the shaft 81. The striker 68 which rocks downward is driven in the same manner. The curved plate 68 constituting the striker is carried by two levers 130, of which one is an angle lever; the two levers rock about the shaft 69 and are located outside the arms 124 of the lower comb 70. Pivotally connected to the shorter arm of one lever 130 is a rod 90 which in turn is connected by a pin 131 with a triangular one-armed lever 91. This lever likewise rocks about the shaft 75 and carries an anti-friction roller 132 which likewise bears against a cam 93 keyed on the shaft 81.

The shaft 81 which drives the cams 92, 123, 129 and 93 is driven, as mentioned above, by the main driving shaft 14 by means of the gear wheels 9, 85, 84, 83 and 82 (Fig. 18). The levers 89, 121, 127 and 91 are influenced by springs and continuously bear on their cams, so that the upper and lower stripping combs 65 and 66 and the lower comb 70 and the striker 68 are driven positively. The right-hand stripping mechanism is exactly symmetrical with that described above.

The cleaning device of the combing segments (Figs. 16 and 17) comprises the known roller brush 133 which is rotated through the medium of intermediate gears 135, 136, 137 and 138 by a gear wheel 134 fast on the shaft 30'. The stripping or doffing roller 139 which is contacted by the comb 140 rotates adjacent to the brush 133. Both the roller and brush are surrounded by a guard forming a box, from which a pipe 141 leads to the hollow shaft 3.

Instead of the combs being arranged on the inside of the combing segments they may be arranged on the outside thereof. Such an arrangement is illustrated in Fig. 2. In contradistinction to the apparatus described above, in this embodiment the clamp is located on the outside, while the stripping mechanism is arranged inside the segments. The arrangement and mode of operation of the various members is otherwise substantially the same as that described above.

Whereas in the embodiment first described above the wound rolls of material to be combed are located in between the segments, they are here located outside. The combed fleece is pulled by the endless apron or band 63$^a$ through the flared guide 94$^a$ and between the rollers 95$^a$ and 86$^a$ and is conveyed into the interior of the stationary hollow shaft 3$^a$, from which the curved sliver is drawn away laterally. The brush 133$^a$ which removes the noils from the combs is arranged with the doffing roller 139ᵃ and the comb 140ᵃ likewise outside the segments.

The described machine operates as follows: Referring to Fig. 1, the sliver is conducted on the left-hand side of the machine from the roller carried in the slots 35 of the carrying frame 33 over the guide plate 36, over the rear feed roll 38 and under the front feed roll 38ᵃ which is intermittently rotated by means of the feed mechanism 53, 54, 55 when the carrying frame 33 moves forward, just as the feed roll 38 is rotated in known manner by means of the feed mechanism 49—52. At each cycle of operations consisting of one rearward movement of the frame 33, when the clamp 15, 17 is closed, and one forward movement thereof, when the clamp is open, the front feed roll feeds the corresponding portion of the sliver in front of the teeth of the combing segment then passing by it, which remove the noils from the length of fibrous material while the clamp is closed. The beard clamped between the jaws 15, 17 is then presented to the stripping mechanism after the combing segment has performed its work and the stripping mechanism has approached the clamp. The feed plate 56 which is then moving forward supports the beard hanging out of the clamp and, when the clamp has opened again, guides it to between the stripping rollers 61 and 62, so that these can seize the tip of the combed beard, whereupon the lower stripping comb 66 enters from below. In addition, the comb 70 enters behind the latter into the beard from below, at the tip of which is a groove or slot 71 into which the upper comb 65 takes from above, so that the beard is now pulled through the two combs 66 and 65. The stripping rollers 61 and 62 hereupon rock back and the combs 65 and 66 ascend and descend so that they are out of reach of the combing segments which now passes. Further, the striker 68 descends and remains in this position during the combing operation in order to prevent the rear end of the beard contacting with the combing segment. This end of the beard still rests between the two rollers 61 and 62 on the apron 63 in order that the tip of the next beard can be laid on the same, so that one connected sliver is obtained. In order that this may take place a pilgrim's step movement is imparted to the lower stripping roller 61 by means of the two above described sets of teeth on the combing segment 72, it being first moved a long distance forward corresponding to the length of the fibers, and then a short distance backward corresponding to the length of the ends of fibers to be placed one on another. The fleece formed by the torn off beards is then removed in the form of a sliver in known manner by the rollers 95 and 96 through the flared guide 94.

The noils combed out by the combing segments are delivered to the brush 133 which rotates at a higher velocity than, but in the same direction as the combs. They are then delivered by the brush to the doffing roller 139, from which they are removed by the comb 140 so that they fall into the box surrounding the rollers, and are then sucked away through the pipe 141 and the stationary hollow shaft 3.

I claim:

1. A combing machine comprising combing segments adapted to pass through between the feeding and stripping devices, wherein the combing segments are arranged to revolve about an axis and the feeding device being located within the circle described by the revolving combing segments.

2. A combing machine comprising a double combing segment adapted to pass through between the feeding and stripping devices, wherein the double combing segment is arranged to revolve about an axis and the feeding device being located within the circle described by the revolving double combing segment.

3. A combing machine comprising combing segments adapted to pass right through between the feeding and stripping devices, wherein the combing segments are arranged to revolve about an axis and the feeding device being located within the circle described by the revolving combing segments.

4. A combing machine comprising combing segments, feeding and stripping devices, wherein the combing segments are arranged to revolve about an axis parallel to the axes of the said feeding and stripping devices and the feeding device being located within the circle described by the revolving combing segments.

5. A combing machine comprising combing segments, feeding and stripping devices, wherein the combing segments are arranged to revolve about an axis and the feeding device, the wound rolls of fibrous material to be combed and the cleaning brush and doffing roller for the noils being located within the circle described by the revolving combing segments.

6. A combing machine comprising combing segments, feeding and stripping devices, wherein the combing segments are arranged to revolve about an axis and the feeding device, the cleaning brush and doffing roller being located within the circle described by the revolving combing segments, which are furnished with combs on the inside.

7. A combing machine comprising combing segments, feeding and stripping devices, wherein the combing segments are arranged to revolve about an axis and the feeding device, the cleaning brush and doffing roller being located within the circle described by the revolving combing segments, from which the noils being drawn by suction to the exterior through a hollow stationary shaft about which the combing segments are arranged to revolve.

8. In a combing machine the combination of nippers, a comb plate mounted about an axis of rotation, teeth in said comb plate directed toward said axis, and means for rotating said comb plate about said axis.

In testimony whereof I have signed my name to this specification in the presence of two subscribing witnesses.

RUDOLF GÜTERMANN.

Witnesses:
 MARIA CARDELLI,
 C. S. TEYLEO.

Copies of this patent may be obtained for five cents each, by addressing the "Commissioner of Patents, Washington, D. C."